(12) United States Patent
Hammond et al.

(10) Patent No.: US 8,695,750 B1
(45) Date of Patent: Apr. 15, 2014

(54) DUAL HYDRAULIC POWER STEERING SYSTEM

(75) Inventors: Robert William Hammond, Hanover, PA (US); Jeffrey Edward Tipton, Gettysburg, PA (US)

(73) Assignee: R.H. Sheppard Co., Inc., Hanover, PA (US)

( * ) Notice: Subject to any disclaimer, the term of this patent is extended or adjusted under 35 U.S.C. 154(b) by 0 days.

(21) Appl. No.: 13/473,729

(22) Filed: May 17, 2012

(51) Int. Cl.
*B62D 5/00* (2006.01)

(52) U.S. Cl.
USPC ........... 180/403; 180/417; 180/441; 180/442; 180/406

(58) Field of Classification Search
USPC ......... 180/321, 322, 323, 403, 406, 417, 441, 180/442
See application file for complete search history.

(56) References Cited

U.S. PATENT DOCUMENTS

| | | | |
|---|---|---|---|
| 2,406,261 A | 10/1944 | Sprinkel | |
| 2,791,915 A | 6/1957 | Merry | |
| 3,604,528 A * | 9/1971 | Williamson | 180/414 |
| 3,750,834 A * | 8/1973 | Luft | 180/414 |
| 3,814,204 A | 6/1974 | Larkin | |
| 4,846,581 A * | 7/1989 | Osterlund et al. | 366/61 |
| 4,921,066 A | 5/1990 | Conley | |
| 2006/0004503 A1* | 1/2006 | Jones | 701/41 |
| 2007/0087946 A1* | 4/2007 | Quest et al. | 508/433 |

FOREIGN PATENT DOCUMENTS

JP    57080968 A  *  5/1982  ............... B62D 1/00

OTHER PUBLICATIONS

"T Box Opposite Rotation Section 2", Pailton Steering Systems, accessed at http://www.flickr.com/photos/pailton_steering_systems/6840770716/.

* cited by examiner

*Primary Examiner* — J. Allen Shriver, II
*Assistant Examiner* — Conan Duda
(74) *Attorney, Agent, or Firm* — Hooker & Habib, P.C.

(57) ABSTRACT

A hydraulic power steering system controllable by left and right steering wheels has two control valves, each valve connected to a respective left and right steering wheel, and a valve arrangement that selectively connects one control valve to a source of high-pressure fluid and disconnects the other control valve from the source of high-pressure fluid.

16 Claims, 6 Drawing Sheets

DUAL HYDRAULIC POWER STEERING SYSTEM

FIELD OF THE DISCLOSURE

This disclosure relates to hydraulic power steering systems for motor vehicles, and in particular to power steering systems controlled by two steering wheels for steering the vehicle from either the left or right side of the vehicle.

BACKGROUND OF THE DISCLOSURE

Heavy duty motor vehicles include a hydraulic power steering system in which the wheels of the steering axle of the vehicle are steered by turning a steering wheel operatively connected to a fluid motor. Turning the steering wheel operates a control valve that directs the flow of high-pressure fluid supplied from a pump or accumulator to the fluid motor and drives the motor piston. Piston movement drives an output member, such as a Pitman arm, connected to a steering linkage that in turn drives the wheels towards or away from their centered positions.

Customers of some heavy-duty motor vehicles, such as refuse trucks, often require that the truck have dual steering wheels that enable steering from either the left or right sides of the truck. Conventional dual steering wheel systems utilize "T-boxes" with miter gears that mechanically interconnect the two steering wheels on the input side of the steering system and drive a common steering shaft that operates the control valve. The miter gears and related bearings generate friction that impairs steering feel, and the mechanical linkages greatly complicate truck assembly and limit design options.

Thus there is a need for an improved hydraulic power steering system for use with motor vehicles having dual steering wheels.

SUMMARY OF THE DISCLOSURE

Disclosed is an improved hydraulic power steering system for use with motor vehicles having dual steering wheels. Each steering wheel is connected to its own hydraulic control valve. The steering system includes additional directional valves that selectively flows high-pressure fluid to the "active" control valve and disconnects the "inactive" control valve from the high-pressure fluid, and fluidly connects the active control valve to the fluid motor and fluidly disconnects the inactive control valve from the fluid motor. In an embodiment, the steering feel of the active steering wheel is essentially identical to that of a vehicle having a single steering wheel.

In a preferred embodiment, the fluid motor consists of two fluid motors, each control valve having a valving member operatively connected to a respective fluid motor. Opening the active control valve drives the pistons of both fluid motors, but movement of the piston of the motor connected to the active control valve closes the valve and provides the expected feedback during the turn back to the driver, as would a conventional single steering wheel system.

In yet a further preferred embodiment, each control valve and its associated fluid motor form part of an integral steering gear. When a control valve is active, its steering gear acts as a "master" steering gear and the other steering gear acts as a "slave" steering gear.

The disclosed hydraulic power steering system has other advantages. The system utilizes time-tested and reliable hydraulic components that are readily modified for use in the improved dual steering wheel system. Because the two steering wheels are not mechanically linked on the input side of the steering system, vehicle assembly is greatly simplified. The steering feel of the two control valves can also be different from one another, allowing, for example, one control valve to be optimized for high-speed driving and the other control valve to be optimized for low-speed driving.

Other objects and features will become apparent as the description proceeds, especially when taken in conjunction with the accompanying drawing sheets illustrating two embodiments of a dual hydraulic power steering system.

DETAILED DESCRIPTION OF THE PREFERRED EMBODIMENTS

Figure 1:
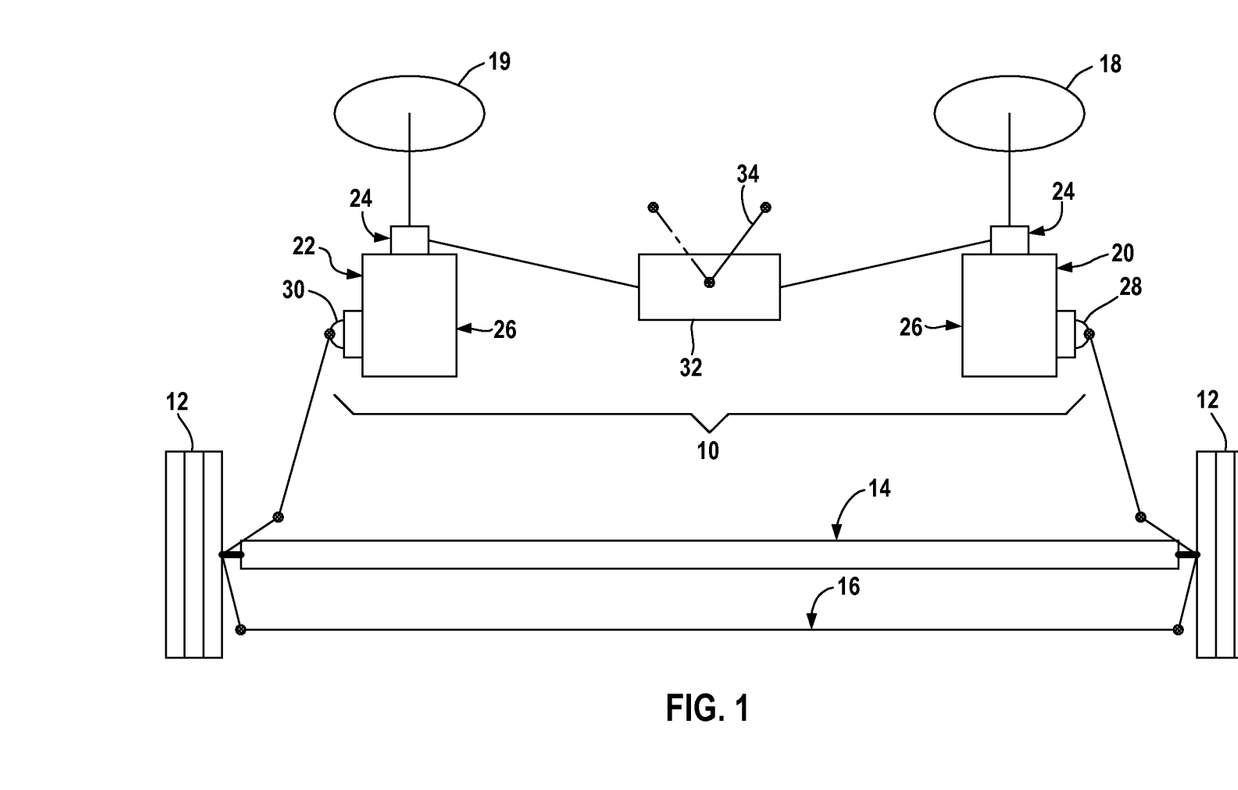
FIG. 1 schematically illustrates a vehicle having a first embodiment hydraulic power steering system.

FIG. 1 schematically illustrates a hydraulic power steering system 10. The power steering system 10 drives the steerable wheels 12 of a motor vehicle 14 via a steering linkage 16. The motor vehicle 14 includes a right-side steering wheel 18 and a left-side steering wheel 19. The right-side steering wheel 18 is operatively connected to an integral steering gear 20 and the left-side steering wheel 19 is operatively connected to an integral steering gear 22, the steering gears 20, 22 forming part of the steering system 10. Each steering gear 20, 22 has a control valve 24 and a fluid motor 26, the control valve 24 connected to the steering wheel 18. The fluid motor 26 of each respective steering gear 20, 22 drives a respective Pitman arm 28, 30 connected to the vehicle steering linkage 16.

The hydraulic assembly 10 further includes a valve assembly 32 that selectively flows high-pressure fluid to the control valve 24 of either the steering gear 20 or of the power steering gear 22 via a valve operator 34. When the valve operator 34 is in the position shown in solid lines in FIG. 2, the valve assembly 32 flows fluid to the control valve 24 of the steering gear 20. The right steering wheel 18 is "active" and steers the wheels 12 and the left steering wheel 19 is inactive and does not steer the wheels 12. When the valve operator 34 is in the position shown in phantom lines in FIG. 1, the valve assembly 32 flows fluid to the control valve 24 of the steering gear 22. The left steering wheel 19 is active and steers the wheels 12 while the right steering wheel 18 is inactive.

Figure 2:
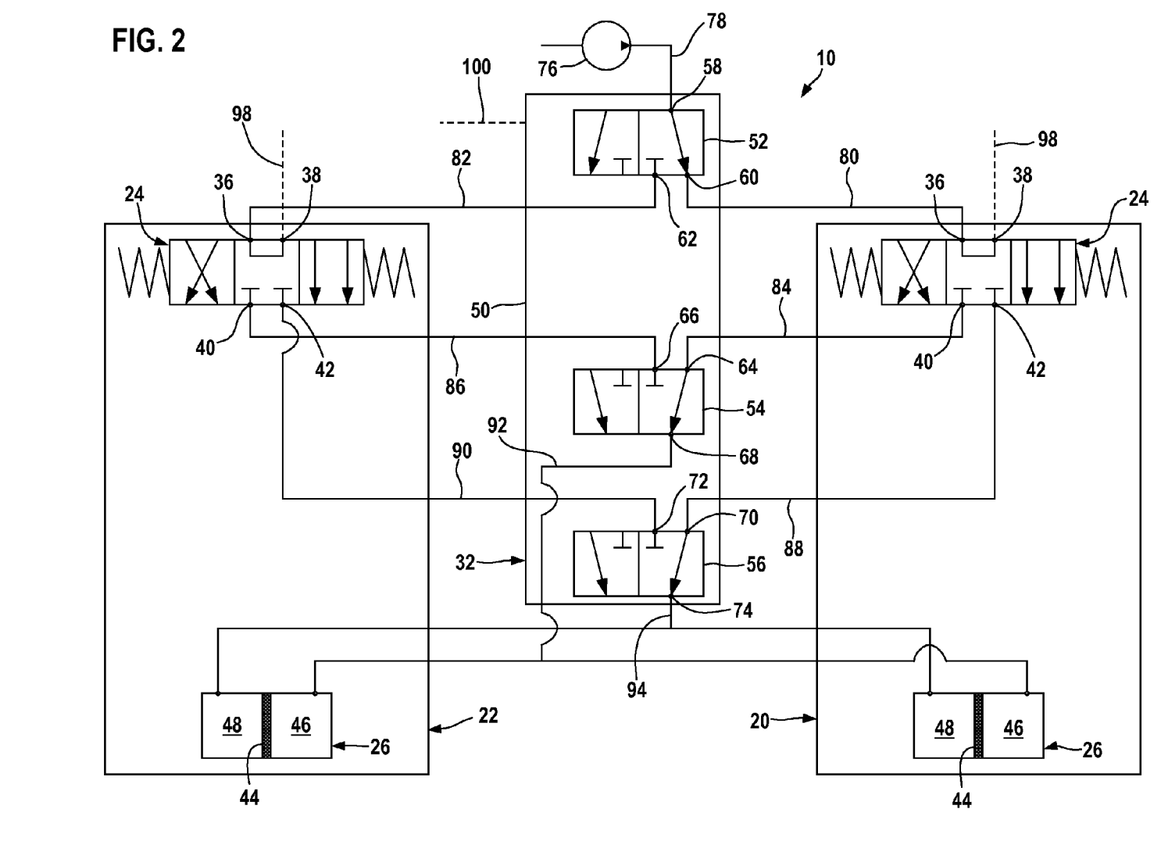
FIG. 2 illustrates the hydraulic power steering system shown in FIG. 1.

FIG. 2 illustrates the hydraulic power steering system 10. The control valve 24 of each steering gear 20, 22 operates in a conventional manner as a three-position, four-connection valve and has an input connection or input port 36, a return connection or return port 38, and respective first and second motor connections or motor ports 40, 42. The illustrated control valves 24 are each an open-center control valve in which the input port 36 is fluidly connected to the return port 38 when the valve 24 is in its centered position. In other embodiments, one or both of the control valves 24 can be a closed-center valve in which input port 36 is fluidly disconnected from the return port 38 when the valve 24 is in its centered position as is known in the power steering art.

The control valves 24 are shown in FIG. 2 in their normal centered position when the wheels 12 are positioned for straight-ahead vehicle motion. Turning the steering wheel attached to the control valve 24 places the valve 24 in an off-centered operating position to fluidly connect the motor ports 40, 42 with the input port 36 and the return port 38 in a conventional manner.

Each fluid motor 26 is formed as a double-acting hydraulic cylinder having a movable piston 44 that fluidly separates first and second motor chambers 46, 48 on opposite sides of the piston 44.

The valve assembly 32 is contained within a common housing 50 and includes a first directional valve 52, a second directional valve 54, and a third directional valve 56.

The first directional valve 52 is a two-position, three-connection valve having an input connection or input port 58, a first discharge connection or discharge port 60, and a second discharge connection or discharge port 62. The directional valve 52 includes two operating positions: a first, or "right side" operating position as shown in FIG. 2 wherein the input port 58 is fluidly connected to the first discharge port 60 and not to the second discharge port 62, and a second, or "left side" operating position wherein the input port 58 is fluidly connected to the second discharge port 62 and not to the first discharge port 60.

The second directional valve 54 is a two-position, three-connection valve having a first input connection or input port 64, a second input connection or input port 66, and a discharge connection or discharge port 68. The directional valve 54 includes two operating positions: a first, or "right side" operating position as shown in FIG. 2 wherein the first input port 64 and not the second input port 66 is fluidly connected to the discharge port 68 and a second, or "left side" operating position wherein the second input port 66 and not the first input port 64 is fluidly connected to the discharge port 68.

The third directional valve 56 is identical to the second directional valve and includes a first input connection or input port 70, a second input connection or input port 72, and a discharge connection or discharge port 74. The directional valve 56 includes two operating positions: a first, or "right-side" operating position as shown in FIG. 2 wherein the first input port 70 and not the second input port 72 is fluidly connected to the discharge port 74 and a second, or "left-side" operating position wherein the second input port 72 and not the first input port 70 is fluidly connected to the discharge port 74.

The input port 58 of the valve 52 is fluidly connected to a source 76 of high-pressure steering fluid by a fluid conduit 78. The illustrated fluid source 76 is a conventional power steering pump, but in other embodiments the source of high-pressure steering fluid can be an accumulator or some other fluid source as is known in the hydraulic power steering art.

The first discharge port 60 of the valve 52 is fluidly connected to the input port 36 of the control valve 24 of the steering gear 20 by a fluid conduit 80. The second discharge port 62 of the valve 52 is fluidly connected to the input port 36 of the control valve 24 of the steering gear 22 by a fluid conduit 82.

The first discharge port 40 of the control valve 24 of the steering gear 20 is connected to the first input port 64 of the valve 54 by a fluid conduit 84. The first discharge port 40 of the control valve 24 of the steering gear 22 is connected to the second input port 66 of the valve 54 by a fluid conduit 86.

The second discharge port 42 of the control valve 24 of the steering gear 20 is connected to the first input port 70 of the valve 56 by a fluid conduit 88. The second discharge port 42 of the control valve 24 of the steering gear 22 is connected to the second input port 72 of the valve 56 by a fluid conduit 90.

The discharge port 68 of the valve 54 is fluidly connected to the first motor chambers 46 of both fluid motors 26 by a fluid conduit 92. The discharge port 74 of the valve 56 is fluidly connected to the second motor chambers 48 of both fluid motors 26 by a fluid conduit 94.

The return port 38 of each control valve 24 is fluidly connected to a drain or fluid reservoir 96 (see FIG. 3) by a return or drain line 98 in a conventional manner. A drain line 100 can also extend from the valve 52 to the reservoir 96 to return valve leakage or to return fluid received from the pump 76 when the valve 52 is an intermediate operating position between left-side and right-side operating positions.

Portions of the fluid conduits 80, 84, 88, 92, and 94 extending through the steering gear 20 are formed as internal flow channels within the steering gear 20. Portions of the fluid conduits 82, 86, 90, 92, and 94 extending through the steering gear 22 are formed as internal flow channels within the steering gear 20.

Portions of the fluid conduits 78, 80, 82, 84, 86, 88, 90, 92, 94 extending through the valve housing 50 can be formed as internal flow channels within the housing 50. Portions of the fluid conduits 84, 88, 92, 94 extending between the steering gear 20 and the housing 50 can be hoses attached to and extending between the steering gear 20 and the housing 50. Portions of the fluid conduits 86, 90, 92, 94 extending between the steering gear 22 and the housing 50 can be hoses attached to and extending between the steering gear 22 and the housing 50. The portion of the fluid conduit 78 extending between the pump 76 and the housing 50 can be a hose attached to and extending between the pump 76 and the housing 50. The hoses enable flexibility in locating the valve housing 50 in relation to the steering gears 20, 22 and the pump 76.

Operation of the hydraulic power steering system 10 and the valve system 32 is described next. The directional valve 52 selectively fluidly connects the high-pressure fluid source 76 with the input port 36 of either the control valve 24 of the steering gear 20 or the control valve 24 of the steering gear 22. The directional valves 54, 56 selectively fluid connect the motor ports 40, 42 of the connected control valve 24 with the appropriate pairs of motor chambers 46, 48 of the fluid motors 26.

To enable steering with the right-side steering wheel 18, the valve operator 34 places each of the directional valves 52, 54, 56 in the right-side operating position. To enable steering with the left-side steering wheel 19, the valve operator 34 places each of the directional valves 52, 54, 56 in the left-side operating position. The valve operator 34 preferably includes solenoid valves that drive the valves 52, 54, 56 and place the valves 52, 54, 56 in the right-side or left-side operating positions in response to a driver-selectable control, switch, button, graphical or non-graphical user interface, or other input device. In other embodiments, the valve operator 34 can be realized as a mechanical linkage or fluid linkage that moves the valves 52, 54, 56 in phase and in unison between right-side and left-side positions.

Figure 3:
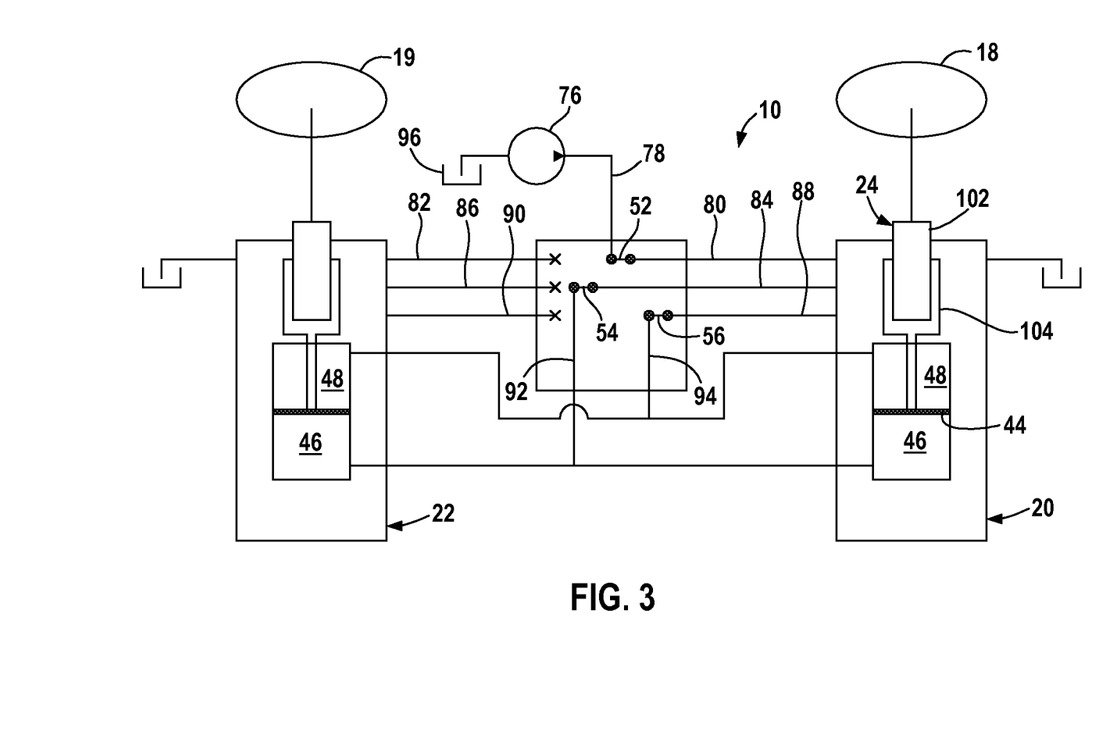
FIG. 3 schematically illustrates the hydraulic power steering system shown in FIG. 1 when the right-side steering wheel is active.

FIG. 3 illustrates the hydraulic power steering system 10 with the directional valves 52, 54, 56 placed in their right-side positions for vehicle steering with the right steering wheel 18. The directional valve 52 fluidly connects fluid lines 78, 80, fluidly connecting the high-pressure source 76 with the input port 36 of the active control valve 24 of the power steering gear 20. The directional valve 54 fluidly connects the fluid lines 84, 92, fluidly connecting the first motor port 40 of the active control valve 24 with the motor chambers 46. The directional valve 56 fluidly connects the fluid lines 88, 94, fluidly connecting the second motor port 42 of the active control valve 24 with the motor chambers 48.

The directional valve 52 disconnects the fluid line 80 from the fluid source 76, the directional valve 54 disconnects the fluid line 86 from the motor chambers 46, and the directional valve 56 disconnects the fluid line 90 from the motor chambers 48. Thus turning the left steering wheel 19 has no hydraulic effect on the steering of the vehicle 14 when the directional valves 52, 54, 56 are set in their right-side positions.

The steering wheel 18 is connected to the first valving member 102 of the active control valve 24 and the fluid motor 26 is operatively connected to the second valving member 104 of the active control valve 24. The connections between the valving members 102, 104 and the steering wheel 18 and the fluid motor 26 are conventional and so will not be described in further detail. Turning the steering wheel 18 rotates the valving member 102 relative to the valving member 104, de-centering the active control valve 24. High-pressure fluid is directed from one of the motor port 40, 42 of the active control valve 24 to one of the pairs of fluid chambers 46, 48 to drive the pistons 44 and fluid is drained from the other pair of fluid chambers 48, 46 and returns to the motor port 42, 40, draining from the power steering gear 20 through the return port 38 and relief line 98.

Movement of the piston 44 of the steering gear 20 drives the valving member 104 and returns the active control valve 24 to its centered condition in a conventional manner.

Figure 4:
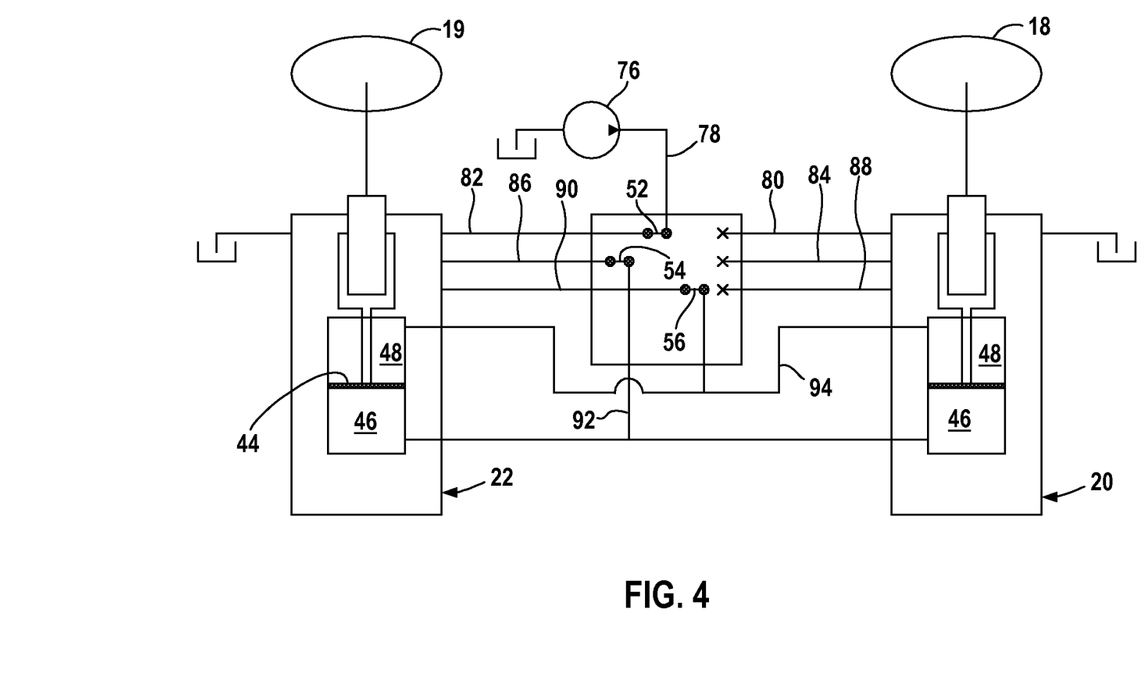
FIG. 4 schematically illustrates the hydraulic power steering system shown in FIG. 1 when the left-side steering wheel is active.

FIG. 4 illustrates the hydraulic power steering system 10 with the directional valves 52, 54, 56 placed in their left-side positions for vehicle steering with the left steering wheel 19. The directional valve 52 fluidly connects fluid lines 78, 82, fluidly connecting the high-pressure source 76 with the input port 36 of the active control valve 24 of the power steering gear 22. The directional valve 54 fluidly connects the fluid lines 86, 92, fluidly connecting the first motor port 40 of the active control valve 24 with the motor chambers 46. The directional valve 56 fluidly connects the fluid lines 90, 94, fluidly connecting the second motor port 42 of the active control valve 24 with the motor chambers 48.

The directional valve 52 disconnects the fluid line 80 from the fluid source 76, the directional valve 54 disconnects the fluid line 84 from the motor chambers 46, and the directional valve 56 disconnects the fluid line 88 from the motor chambers 48. Thus turning the right steering wheel 18 has no hydraulic effect on the steering of the vehicle 14 when the directional valves 52, 54, 56 are set in their left-side positions.

The left steering wheel 19 is connected to the active control valve 24 of the integral steering gear 22 and directs the flow of flow and return of fluid from the fluid motors 26 as previously described for steering with the right steering wheel 18. Movement of the piston 44 of the steering gear 20 returns the active valve 24 to its closed position.

Figure 5:
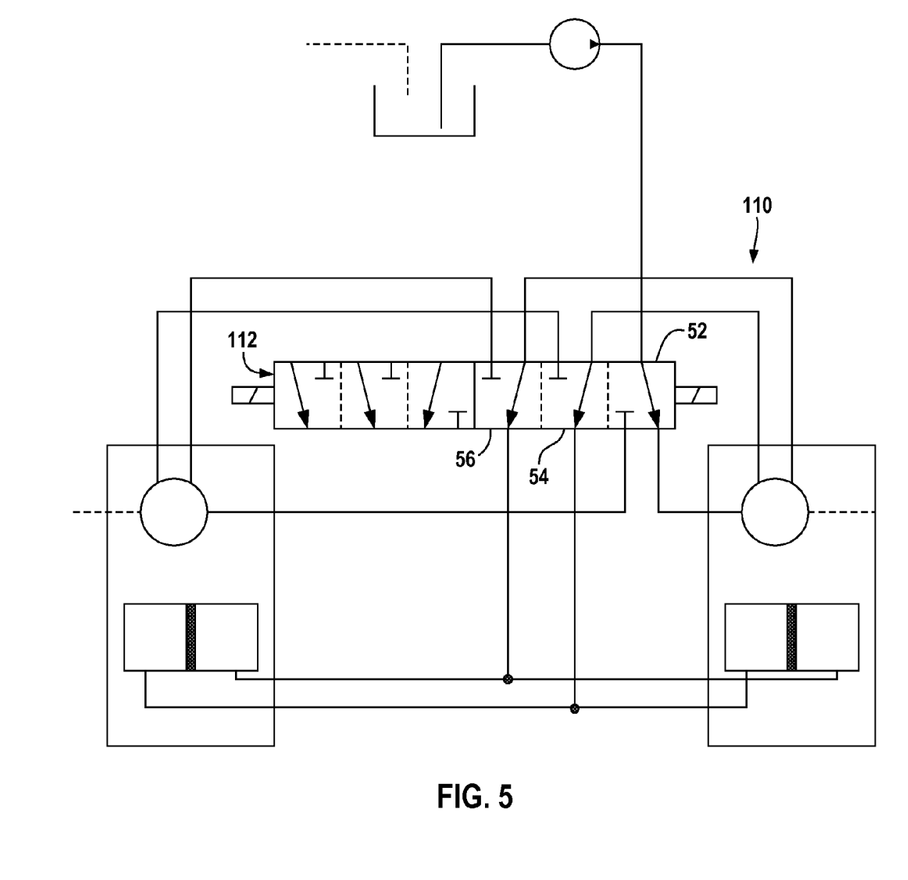
FIG. 5 is similar to FIG. 2 and illustrates a second embodiment hydraulic power steering system.

FIG. 5 illustrates a second embodiment hydraulic power steering system 110 similar to the power steering system 10. Only the differences of the system 110 from the system 10 will be discussed.

In this embodiment the directional valves 52, 54, 56 are formed as parts of a single two-position, eight connection, solenoid-operated valve 112. This enables the directional valves 52, 54, 56 to share some common components. The valve 112 is illustrated in FIG. 5 with the valves 52, 54, 56 in their right-side positions, the same as shown in FIG. 2. The valve 112 can also be placed in its left-side position in which the valves 52, 54, 56 are placed in their left-side positions. Operation of the power steering system 112 is identical to that of the steering system 10. Valves formed from other combinations of the valves 52, 54, 56 are also possible.

Figure 6:
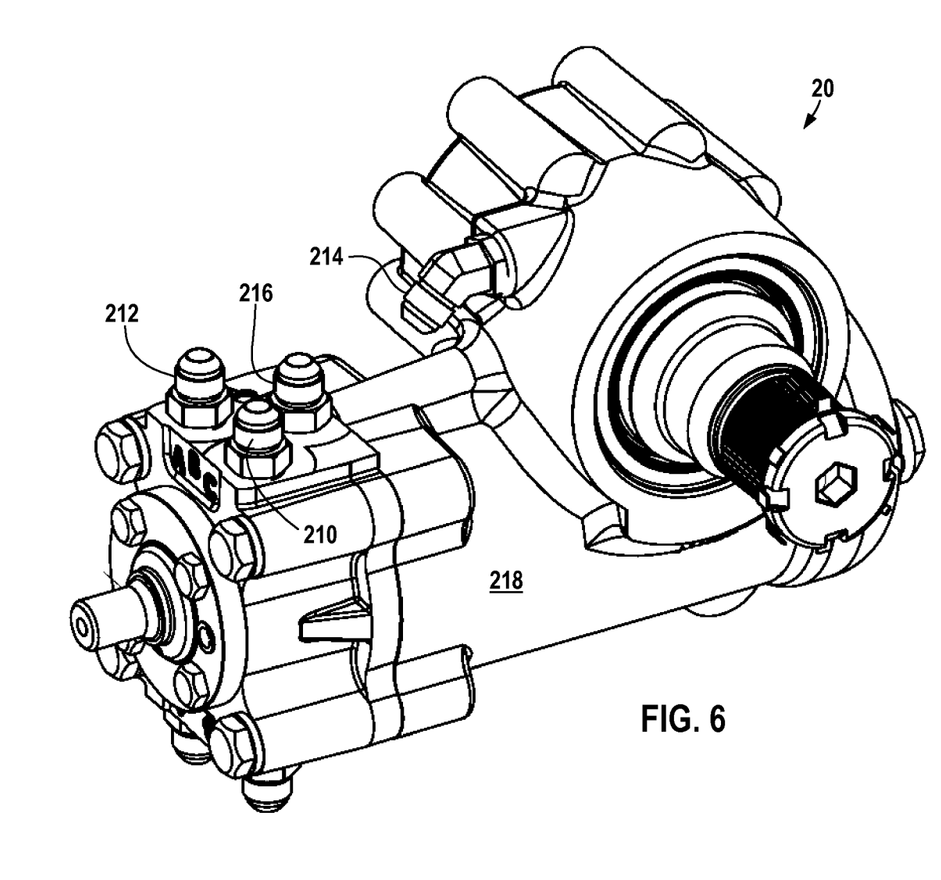
FIG. 6 illustrates an integral steering gear used in the hydraulic power steering system shown in FIGS. 1 and 5.

Conventional integral steering gears have internal flow channels from the motor ports of the control valve to the motor chambers of the fluid motor. An integral steering gear that may be used in the hydraulic system 10, 110, such as the illustrated steering gear 20, may differ from an otherwise conventional integral steering gear in that the internal flow channels connected to the motor ports 40, 42 and to the motor chambers 46, 48 each extend to a respective opening in the integral steering gear housing, with hoses extending from the openings to the directional valves as previously described FIG. 6 illustrates the integral steering gear 20 shown in FIG. 2. Steering gear 20 is otherwise identical to the conventional integral steering gear described in the previous paragraph but has been modified to eliminate the internal flow channels between the motor ports and the motor chambers as described above. The steering gear 20 includes four additional external hose fittings 210, 212, 214, 216 that each form a portion of respective fluid line 84, 88, 92, 94 and flow fluid into or out of the housing 218. The internal flow channels between the control valve and the fluid motor that were present are blocked so that all fluid flow between the control valve and fluid motor must pass through the hose fittings 210, 212, 214, 216.

The illustrated hydraulic power steering systems 10, 110 utilize integral steering gears 20, 22. In other possible embodiments of the invention, one or both of the integral steering gears 20, 22 can be replaced by a non-integral steering gear, that is, the control valve and fluid motor are housed in separate housings. The fluid motor may drive a rack of a rack-and-pinion steering gear.

In yet other possible embodiments of the present invention, the hydraulic power steering system may include only a single fluid motor. Such a system may be formed by using only a single integral steering gear or rack-and-pinion steering gear. Fluid lines 92, 94 are connected to the respective motor chambers of the only one fluid motor. A valving member of the control valve connected to the fluid motor may be driven by the fluid motor to close the control valve and provide feedback as described above. The other control valve may be unconnected to the fluid motor with no mechanical feedback to close the valve. Such a system may be of use where the control valve connected to the fluid motor is used for normal steering at highway speeds and the other control valve is used for low-speed, specialized driving needs. The steering wheel connected to the control valve with feedback may be a conventional steering wheel for highway steering, and the steering wheel connected to the other control valve may be embodied as a joystick control or tiller control for specialized slow-speed steering. In yet other embodiments with only a single fluid motor, the otherwise unconnected control valve could be mechanically connected to the fluid motor for feedback by an additional mechanical connection to the fluid motor so that each control valve has feedback when active in response to steering movement of the wheels 12.

The term "steering wheel" as used herein includes both a conventional steering wheel that is rotatable about an axis to control operation of a control valve, as well as any other type of steering mechanism or control, such as a tiller mechanism, joystick, and any other known steering mechanism, that is moved, displaced, or pivoted by a human driver or an automated steering system to control operation of a control valve (and may not necessarily require rotation about an axis to operate).

While at least one preferred embodiment has been described, it is understood that this is capable of modification, and that the disclosure is not limited to the precise details set forth but includes such changes and alterations as fall within the purview of the following claims.

What we claim as our invention is:

1. A hydraulic steering system for turning the steerable wheels of a vehicle, the system comprising:
  a first fluid motor having first and second chambers;
  a second fluid motor having third and fourth chambers;
  first and second control valves, each first and second control valve having an input port, a return port, and first and second motor ports, each first and second control valve having a first position wherein the input port is fluidly connected to the first motor port and the return port is fluidly connected to the second motor port and a second position wherein the input port is fluidly connected to the second motor port and the return port is fluidly connected to the first motor port;
  a first directional valve having an input port, a first discharge port, and a second discharge port, the first directional valve having a first position wherein the input port is fluidly connected to the first discharge port and not to the second discharge port and a second position wherein the input port is fluidly connected to the second discharge port and not to the first discharge port;
  a second directional valve having a first input port, a second input port, and a discharge port, the second directional valve having a first position wherein the first input port and not the second input port is fluidly connected to the discharge port and a second position wherein the second input port and not the first input port is fluidly connected to the discharge port;
  a third directional valve having a first input port, a second input port, and a discharge port, the third directional valve having a first position wherein the first input port and not the second input port is fluidly connected to the discharge port and a second position wherein the second input port and not the first input port is fluidly connected to the discharge port;
  a first flow conduit extending from the first discharge port of the first directional valve to the input port of the first control valve;
  a second flow conduit extending from the second discharge port of the first directional valve to the input port of the second control valve;
  a third flow conduit extending from the first motor port of the first control valve to the first input port of the second directional valve;
  a fourth flow conduit extending from the first motor port of the second control valve to the second input port of the second directional valve;
  a fifth flow conduit extending from the second motor port of the first control valve to the first input port of the third directional valve;
  a sixth flow conduit extending from the second motor port of the second control valve to the second input port of the third directional valve;
  a seventh flow conduit extending from the discharge port of the second directional valve to the second and fourth chambers; and
  an eighth flow conduit extending from the discharge port of the third directional valve to the first and third chambers.

2. The hydraulic steering system of claim 1 wherein the first control valve comprises a movable valving member driven by the first fluid motor and the second control valve comprises a movable valving member driven by the second fluid motor.

3. The hydraulic steering system of claim 1 wherein the first, second, and third directional valves are housed within a common housing.

4. The hydraulic steering system of claim 1 wherein the first and second, and third directional valves are each solenoid operated for moving the valve between first and second positions.

5. The hydraulic steering system of claim 1 wherein the first control valve and the first fluid motor are housed within a first common housing having a first exterior wall, the first flow conduit, the third flow conduit, and the fifth conduit flow extending through said first wall.

6. The hydraulic steering system of claim 5 wherein the second control valve and the second fluid motor are housed within a second common housing having a second exterior wall, the second flow conduit, the fourth flow conduit, and the sixth flow conduit extending through said second wall.

7. The hydraulic steering system of claim 1 wherein each said flow conduit has a length dimension and at least one of the first, second, third, fourth, fifth, and sixth flow conduits comprises a hose extending for at least a portion of the length of said at least one flow conduit.

8. The hydraulic steering system of claim 7 wherein the at least one flow conduit includes the first, third, and fifth flow conduits, each of the first, third, and fifth flow conduits comprising a respective hose extending for at least a portion of the length of the flow conduit.

9. The hydraulic steering system of claim 7 wherein the at least one conduit includes the second, fourth, and sixth flow conduits, each of the second, fourth, and sixth flow conduits comprising a respective hose extending for at least a portion of the length of the flow conduit.

10. The hydraulic steering system of claim 1 wherein at least one of the fluid motors drives a rack.

11. A steerable vehicle comprising:
  one or more steerable wheels attached to a common steering linkage for simultaneous turning of the one or more steerable wheels to the left or right by actuation of the steering linkage;
  a source of high-pressure fluid;
  a first steering wheel, a second steering wheel, a first fluid motor having first and second motor chambers, a second fluid motor having first and second motor chambers, a first control valve, and a second control valve;
  the first steering wheel operatively connected to the first control valve, the second steering wheel operatively connected to the second control valve;
  each of the first and second fluid motors connected to the steering linkage and disposed to actuate said steering linkage, each of the first and second fluid motors disposed to independently actuate the steering linkage without operation of the other of the said first and second fluid motors;
  each of the first and second control valves comprising an input port fluidly connected to the source of high-pressure fluid, and first and second motor ports fluidly connected to respective first and second motor chambers of each of the first and second fluid motors;
  a first directional valve disposed between the source of high-pressure fluid and the first and second control valves, the first directional valve operable to selectively fluidly connect the input port of one of the first and second control valves with the source of high-pressure fluid and to fluidly disconnect the input port of the other of the first and second control valves from the source of high-pressure fluid;

a second directional valve disposed between the control valves and the fluid motors and operable to selectively fluidly connect the motor ports of one of the first control valves with the fluid motors and to fluidly disconnect the motor ports of the other of the first and second control valves from the fluid motors.

12. The vehicle of claim 11 wherein each fluid motor drives a respective, different Pitman arm connected to the steering linkage.

13. The vehicle of claim 11 each fluid motor drives a rack connected to the steering linkage.

14. The vehicle of claim 11 wherein the first steering wheel is of the type comprising a rim that extends around an axis, the rim rotatable about the axis, and the second steering wheel is of a type different from the first steering wheel.

15. The vehicle of claim 11 wherein the first and second directional valves are housed in a common housing and a plurality of hoses extend between the housing and the fluid motors.

16. The vehicle of claim 11 wherein hoses extend between the control valves and the first directional valve.

* * * * *